Jan. 15, 1957 NORISHIGE YOKOMAKI 2,777,711
PORTABLE FOLDING TYPE BICYCLE
Filed Aug. 28, 1951 2 Sheets-Sheet 1
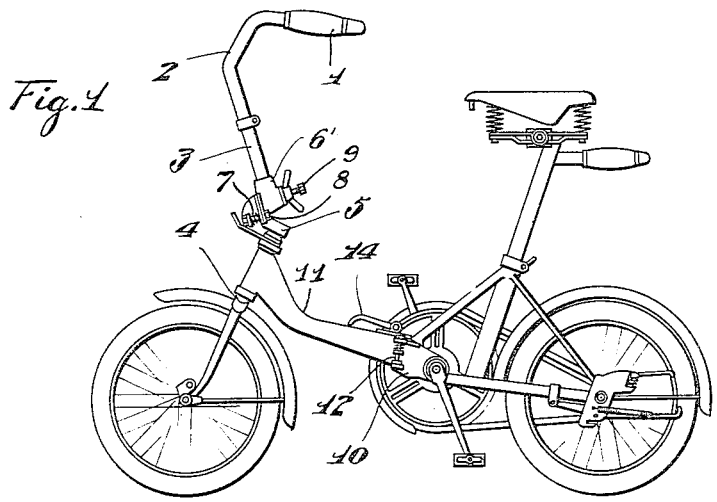
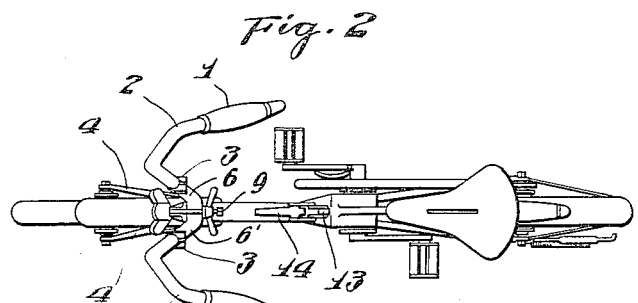
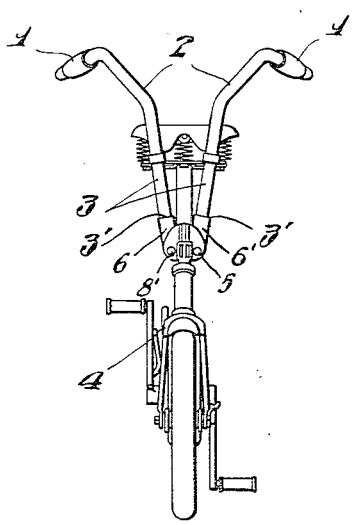
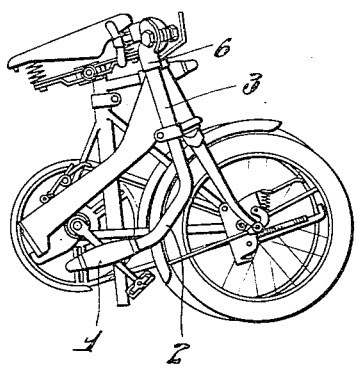
INVENTOR.
Norishige Yokomaki
BY Mock & Blum
ATTORNEYS

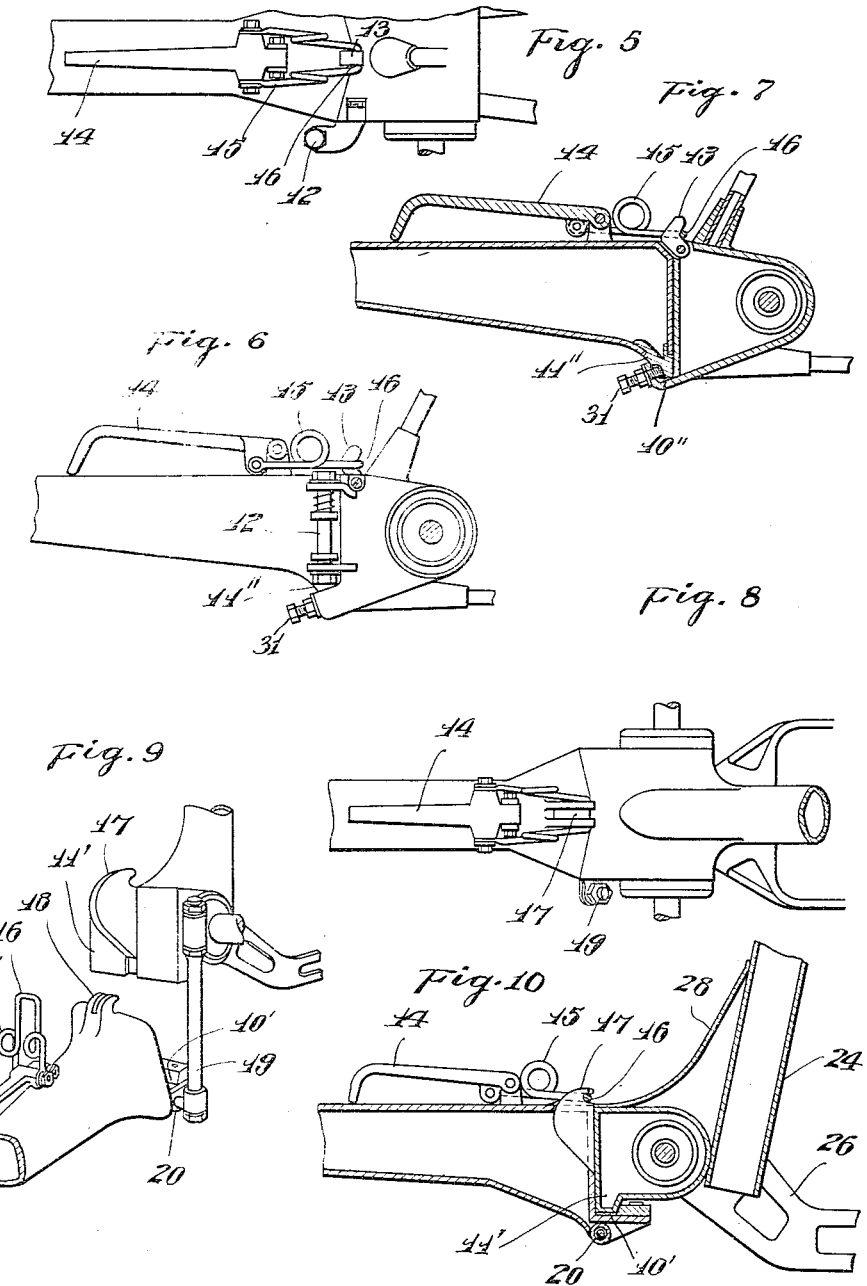

United States Patent Office 2,777,711
Patented Jan. 15, 1957

2,777,711

PORTABLE FOLDING TYPE BICYCLE

Norishige Yokomaki, Tokyo, Japan, assignor of one-third to Sigeo Kitakami, and one-third to Yoshimasa Ono, both of Tokyo, Japan Application August 28, 1951, Serial No. 243,996

3 Claims. (Cl. 280—287)

This invention relates to a bicycle and more particularly to a portable folding type bicycle.

An object of the invention is to provide a bicycle having a very strong and durable construction when it is assembled, and also being adapted to be folded very easily and quickly so as to reduce the size thereof for convenience to carry and store.

In accordance with this invention a portable folding type bicycle comprises a framework consisting of a front frame and rear frame made to take the form of a unitary one when said both frames are connected together by means of a coupling means and locking means provided adjacent to a hanger portion of the rear frame.

Other objects and advantages of the invention will be apparent from the following description taken in conjunction with the accompanying drawings in which:

Fig. 1 is a side elevational view of one embodiment of a bicycle in accordance with this invention showing various parts assembled for using. Fig. 2 is a plan view of Fig. 1. Fig. 3 is a front view of Fig. 1. Fig. 4 is a side view in the folded state of the bicycle shown in Fig. 1 to Fig. 3. Fig. 5 is a plan view of one form of a connecting part for the front and rear frames. Fig. 6 is a side view of Fig. 5. Fig. 7 is a longitudinal sectional view of Fig. 6. Fig. 8 is a plan view of another form of a connecting part for the front and rear frames assembled together. Fig. 9 is a longitudinal sectional view of Fig. 8. Fig. 10 is a perspective view of the connecting part showing the various parts disassembled.

Referring to the drawings which illustrate several forms in accordance with this invention, particularly in Figs. 1–4 two right and left bent handle-bars 2, 2 respectively provided with handles 1, 1 have their lower portions slidably fitted in outer tubes 3, 3 and adapted to be fixed thereto symmetrically by means of suitable clamps or fixing means when said bars are adjusted their lengths so as to present a proper height as required. The outer tubes 3, 3 have their lower ends 3', 3' pivoted symmetrically to a handle post 5 which is fixed on an upper end of a front fork stem 4. To the upper end of the handle post 5 metal members 6, 6' are pivoted by means of bolts 8, 8' respectively which bolts are provided with helical springs 7, 7 and constitute turning pivots for the handle-bars. Said metal members are fixed at their upper ends to the lower ends of the parts including the handle-bars and also have slots respectively at their inner parts to be coincided with each other. Accordingly, when a locking bolt 9, having a cooperating wing nut is inserted into the slots and the wing nut is tightened, the handle part is maintained at a predetermined height. When the locking bolt 9 is released by unscrewing the wing nut, the handle-bars can be swung respecively right and left through one hundred and eighty degrees into a folded position. Also, as the handle-bars 2, 2 with handles 1, 1 can be slid up and down in the outer tubes 3, 3 without changing an angle of the bars with respect to a vertical centre line, a distance between both handles 1, 1 can be shortened when the bars are slid downwardly in the outer tubes.

A framework in this invention is divided into two sections, such as a front frame and rear frame at about the middle point of the framework in order to facilitate the disjunction and folding thereof. The construction of the framework is made to present as small a size as possible when it is folded or collapsed and also to reduce the weight of the framework itself. In other words, with a view to make the framework in the form of one strong beam passing over the crank shaft with the exception of the saddle support portion on the rear frame, a projection extending downwardly from the underside of one frame may be so constructed as to engage with a recess provided on another frame. Said projection and recess constitute a coupling means for both frames and are in cooperation with a pivotal locking means for the same frames. The arrangement of these engaging portions is such that when the projection and recess are engaged together a bending moment caused owing to the downward pressure by the load from the upper parts of the frames is substantially received by the contacting surface between the projection and recess, and the greater the load from the upper parts the stronger the engagement between the projection and recess is obtained.

In one embodiment of the framework shown in Figs. 5–7, an upward recess 10" is formed at the front part of a bearing for crank shaft or a hanger portion provided on the rear frame (also see Fig. 1) and a projection 11" is so provided at the tail end of the front frame as to engage with the upward recess 10". This coupling means consisting of the projection and recess is also locked by means of a pivotal locking means, such as a bolt 12 and nuts provided on the side wall of the coupling means on the rear frame. A pawl 13 pivoted to the rear frame is also adapted to engage with a loop portion 16 of a spring member 15 attached to a fixing lever 14 which is provided on the front frame. Thus, when fixing lever 14 is moved toward the position as shown in Fig. 5, the coupling means is pressed from the upper part resiliently so as to hold said both frames firmly together in engaged relation. Additional securing means for the frames in service position by means of a bolt 31 are carried by the lower portion of rear frame 10. This bolt 31 seats against the front frame 11 when the frames are extended.

In another embodiment of a framework shown in Figs. 8–10, a projection 11' is formed at the front part adjacent to the bearing for crank shaft provided on the rear frame and is adapted to be engaged with a seat or recess 10' formed in the rear end of the front frame. The projection and recess or seat constitute a coupling means for the both frames similar to those in the former arrangement. Above the coupling means the rear frame is provided at its forward end with a projecting hook or plate 17 which is engaged wtih a corresponding slot 18 formed with spaced hook portions on both sides thereof (see Fig. 10) provided on the front frame. An upper part of the projecting plate is adapted to engage with a loop portion 16 of a spring member 15 attached to a fixing lever 14 which is pivotally mounted on the rear part of the front frame. Accordingly, the front frame and rear frame are held together firmly in engaged relation. Also, in addition to the coupling means, there are provided a vertical bolt 19, a horizontal bolt 20 and a locking means consisting of the projecting plate 17 and the slot 18. Thus, the front frame may be turned in a horizontal plane with respect to the rear frame so as to take a folded or collapsed position in parallel with the rear frame at the right side thereof because the front frame and rear frame are supported by the vertical pivotal bolt 19 provided somewhat at the right hand side from a central line of the both frames.

Finally, the coupling means of the frames is released by releasing the locking means therefor and then the front frame is turned about one hundred eighty degrees about the vertical pivotal bolt to take the position in parallel relation with respect to the rear frame so that boh frames can be held firmly together by a suitable clamp.

If the bicycle is desired to be assembled from the collapsed state the operation therefor is made in a reverse order as the above. The folding and assembling of the bicycle in this invention can be carried out simply and quickly, for example, about within thirty seconds without any tool.

What is claim is:

1. A portable folding type bicycle comprising a framework divided into a front sectional frame and a rear sectional frame with the division point approximately midway of the length of the frame-work when the bicycle is in active service position, and hinge means connecting said sectional frames pivotally at such division point to thereby enable movement of said frame sections between such service position and a position in which the two wheels of the bicycle are located substantially side-by-side in spaced and approximately parallel relation, the pivotal axis of said hinge being located on a vertical axis of the bicycle frame in extended service position, a member on one of the sections having an upwardly extending recess at a part of a hanger portion with which a crank shaft is engaged, the other frame section carrying a downward projection co-operative with said recess and constituting therewith a coupling for the pair of frame sections, said coupling also having spring means carried by one section and haivng a lop adapted to engage a hook-like element carried by the other section to thereby hold the frame sections resiliently and firmly in engaged position but capable of being uncoupled, and a fixing lever co-operative with the spring means for maintaining the latter in either position and for movement thereof between such positions.

2. A bicycle as in claim 1 characterized in that the hook-like element is carried by one of the frame sections and co-operates with a second element carried by the other section with the latter carrying a pair of spaced hooks formed to receive the hook-like element between the pair of hooks with the several hooks in lateral alinement with the group of positioned hooks adapted to be collectively engaged by the loop of the spring means.

3. A bicycle as in claim 1, characterized in that a co-operating bolt securing means is carried by the lower portion of the rear sectional frame for seating in the lower portion of the front sectional frame for locking the sections in service position in addition to said spring means.

References Cited in the file of this patent

UNITED STATES PATENTS

| | | |
|---|---|---|
| 578,011 | Girardet | Mar. 2, 1897 |
| 692,383 | Tarizan et al. | Feb. 4, 1902 |
| 1,469,196 | Strange | Sept. 25, 1923 |
| 1,584,314 | Mamiya | May 11, 1926 |
| 1,610,016 | Kuchta | Dec. 7, 1926 |
| 1,652,102 | Elmer | Dec. 6, 1927 |
| 2,366,061 | Schwinn | Dec. 26, 1944 |
| 2,372,024 | Schwinn | Mar. 20, 1945 |
| 2,705,156 | Torre | Mar. 29, 1955 |

FOREIGN PATENTS

| | | |
|---|---|---|
| 549,989 | France | Dec. 2, 1922 |
| 578,384 | Great Britain | June 26, 1946 |
| 360,530 | Italy | June 23, 1938 |